(12) United States Patent
Kim

(10) Patent No.: US 6,273,783 B1
(45) Date of Patent: Aug. 14, 2001

(54) CONCENTRIC MACHINING DEVICE AND METHOD

(75) Inventor: Hyeon-Cheol Kim, Kumi-shi (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/434,259

(22) Filed: Nov. 5, 1999

(30) Foreign Application Priority Data

Nov. 6, 1998 (KR) .................................................. 98-47539

(51) Int. Cl.$^7$ ............................. B24B 49/00; B24B 51/00
(52) U.S. Cl. ................................. 451/8; 451/9; 451/268; 451/287
(58) Field of Search .................................. 451/5, 8, 9, 10, 451/11, 28, 41, 63, 268, 269, 270, 271, 242, 285, 287, 288, 364, 397, 398

(56) References Cited

U.S. PATENT DOCUMENTS

| | | |
|---|---|---|
| 4,721,357 | 1/1988 | Kovalchick et al. . |
| 5,111,571 | 5/1992 | Ciboldi et al. . |
| 5,459,564 * | 10/1995 | Chivers ................................. 356/73.1 |
| 5,503,590 * | 4/1996 | Saitoh et al. ............................. 451/11 |
| 5,734,768 | 3/1998 | Kim et al. . |
| 5,802,937 | 9/1998 | Day et al. . |
| 5,909,530 | 6/1999 | Ohkubo et al. . |
| 5,918,196 | 6/1999 | Jacobson . |

* cited by examiner

Primary Examiner—Derris H. Banks
(74) Attorney, Agent, or Firm—Robert E. Bushnell, Esq.

(57) ABSTRACT

There are provided a concentric machining device and method. The concentric machining device is used to machine the outer curcumferential surface of a cylindrical body having an inner diameter and an outer diameter with respect to the center of the inner diameter so that the center of the outer diameter is identical with the center of the inner diameter. In the concentric machining device, the cylindrical body is mounted in a mounting means installed in a rotating means. The rotating means rotates the mounting means and the cylindrical body according to a rotation control signal. A photographing means photographs the cross-section of the cylindrical body. A controlling means generates the rotation control signal to rotate the rotating means at a predetermined angle when the cylindrical body is mounted, calculates an eccentricity being the difference between the inner diameter center of the cylindrical body and a rotation center of the rotating means from information about the photographed cross-section received from the photographing means, and generates a machining control signal corresponding to the eccentricity. A transferring means transfers the machining control signal, and an adjusting means adjusts the position of the cylindrical body according to the machining control signal received from the transferring means so that the inner diameter center of the cylindrical body is identical with the rotation center of the rotating means.

25 Claims, 7 Drawing Sheets

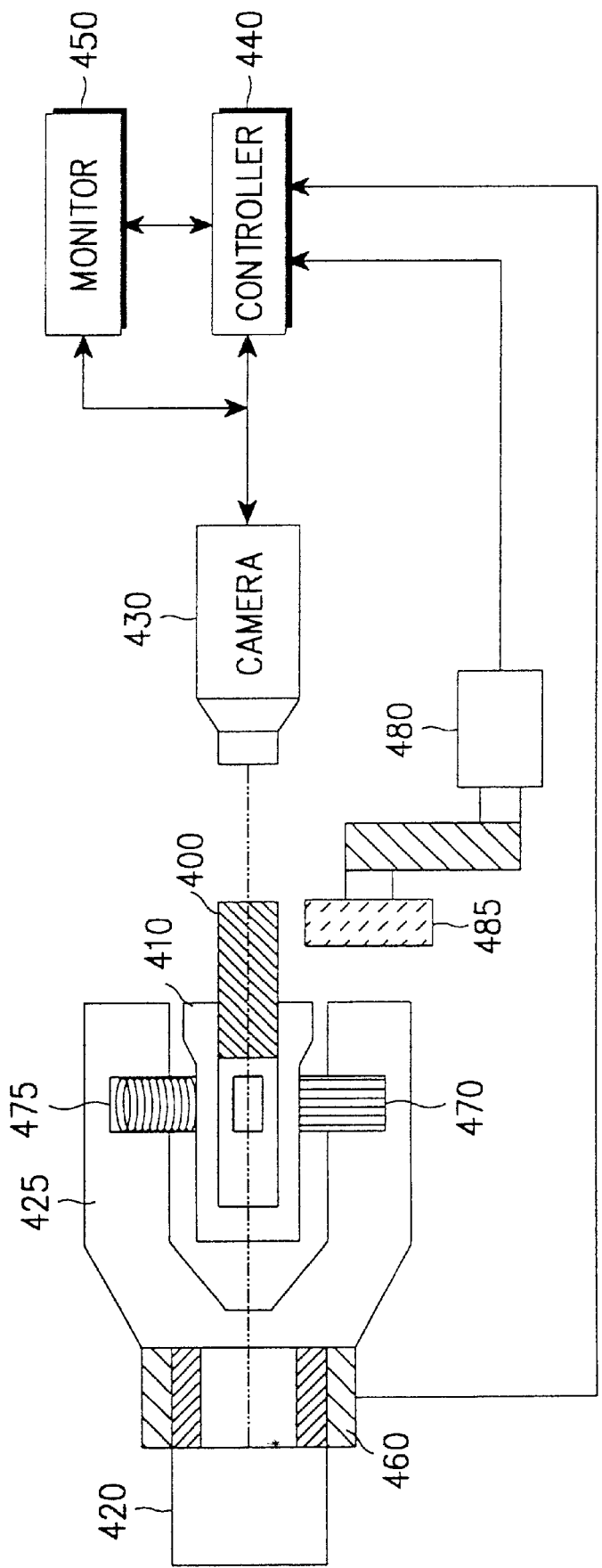

CONCENTRIC MACHINING DEVICE AND METHOD

This application makes reference to, incorporates the same herein, and claims all benefits accruing under 35 U.S.C. §119 from my application CONCENTRIC MACHINING DEVICE AND METHOD filed with the Korean Industrial Property Office on Nov. 6, 1998 and there duly assigned Serial No. 47539/1998.

BACKGROUND OF THE INVENTION

1. Field of the Invention

The present invention relates generally to a concentric machining device, and in particular, to a device and method for machining the outer circumferential surface of an optical communication ferrule or a cylindrical body having a fine inner diameter of 200 µm or below, setting an inner circle concentric with an outer circle.

2. Description of the Realted Art

Concentric machining refers to machining a cylindrical body having an inner circle and an outer circle so that the outer circle is concentric with the inner circle. For the concentric machining, a pin or a wire is inserted into a fine inner diameter.

In a conventional concentric ferrule machining system, for concentric machining of ferrules, a wire is inserted into the inner diameter of the plurality of ferrules, both ends of the wire are fixed to fixtures, a tensile force is applied to the wire, and then the outer circumferential surfaces of the ferrules are machined using a polishing wheel.

To concentrically machine a cylindrical body having an inner diameter and an outer diameter, a steel wire processed with high precision is inserted into the inner diameter of the cylindrical body and an outer circumferential surface of the cylindrical body is machined by a predetermined amount by a polishing wheel, with the center of the inserted wire set as the center of the inner diameter of the object. Thus, the different inner and outer diameters become identical after machining the outer circumferential surface of the cylindrical body concentric with the center of the inner diameter.

However, the conventional machining method has some problems in machining range and precision:

(1) Wires are seldom, if ever, suitable for a very small inner diameter. Even such a wire does not withstand a tensile force applied to both ends thereof in concentric machining of a machining object due to the too small inner diameter.

(2) Concentric machining is impossible if an inner circle of a machining object is tapered or in an irregular shape, due to a varied inner diameter.

(3) There is a limit to increasing precision. Here, if an insertion margin between the inner diameter and the wire is 0.3 µm and the machining precision of the wire is 0.2 µm, the machining precision of the inner diameter is 0.5 µm. Therefore, a maximum error of 1 µm can occur and the machining object is not suitable for precision machining.

(4) The friction between an inner circumferential surface of a machining object and a wire inserted into the inner diameter of the machining object is likely to scratch or deform the inner circumferential surface.

(5) In concurrently machining a plurality of ferrules by insertion of a wire, possible introduction of foreign materials between the ferrules induces errors, thereby making precision machining impossible.

Examples of methods of the conventional art relevant to machining cylindrical bodies or making of ferrules are seen in the following U.S. Patents.

U.S. Pat. No. 4,721,357, to Kovalckick et al., entitled *Methods Of And Apparatus For Reconfiguring Optical Fiber Connector Components And Products Produced Thereby*, describes an apparatus for reconfiguring a connector for plugs terminating a fiber optical cable. The method involves rotating the plug while passing light through the optical fiber to determine the direction of the axis of the optical fiber and then making adjustments to make the center of the fiber core coincident with the axis of rotation.

U.S. Pat. No. 5,111,571, to Ciboldi et al., entitled *Method For Manufacturing A Body With A Surface Of Revolution At Its End With The Axis Thereof Aligned With An Axis Of The Body*, describes an apparatus for making a ferrule for expanded beam connectors in which the ferrules have a surface of revolution in the form of a tapered cavity. During removal of material, mechanical compensating forces determined by transverse movements of the shaft of the body are applied to prevent such transverse movement.

U.S. Pat. No. 5,734,768, to Kim et al, entitled *Aligning Apparatus For Optical Coupling And Manufacturing Method Thereof*, describes a ferrule for an optical fiber coupling.

U.S. Pat No. 5,802,937, to Day et al., describes an apparatus for machining surfaces to nanometer accuracies. Current is measured through the cutting tool and the workpiece, and the cutting tool is displaced to maintain the current flow at a constant level.

U.S. Pat. No. 5,909,530, to Ohkubo et al., entitled *Method For Manufacturing Ferrule For Use With Optical Fiber Connector*, describes a method for manufacturing a ferrule including an outside diameter grinding step using the both center method.

U.S. Pat No. 5,918,196, to Jacobson, entitled *Vision System For Analyzing Solid-of-Revolution Radius Profile*, describes a method for visually monitoring the radius of an item rotating about a fixed axis. The method includes steps of acquiring an image of a circumferential feature of the solid using a camera, and determining the equation of an ellipse that substantially fits a set of points along the image of the feature. The patent, however, does not discuss using the data to accurately machine ferrules.

These patents, however, do not address the problems discussed above. Therefore, based on my reading of the art, I believe that what is needed is an improved method for concentric machining of cylindrical bodies with small internal diameters.

SUMMARY OF THE INVENTION

It is therefore an object of the present invention to provide an improved concentric machining device and method.

It is also an object of the present invention to provide an improved machining device and method for making cylindrical bodies with inner diameters of less than 200 µm.

A further object of the invention is to provide an improved machining device and method for making ferrules for optical communications.

A yet further object of the invention is to provide a machining device and method which can machine an object with a tapered or irregular bore.

A still further object of the invention is to provide a machining device and method which can machine an object with greater precision.

Yet another object of the invention is to provide a machining device and method which avoids scratching of the bore of the machined object by a wire holding the object during machining.

To achieve the above objects, there is provided a concentric machining device. The concentric machining device is used to machine the outer circumferential surface of a cylindrical body having an inner diameter and an outer diameter with respect to the center of the inner diameter so that the center of the outer diameter is identical with the center of the inner diameter. In the concentric machining device, the cylindrical body is mounted in a mounting means installed in a rotating means. The rotating means rotates the mounting means and the cylindrical body according to a rotation control signal. A photographing means photographs the cross-section of the cylindrical body. A controlling means generates the rotation control signal to rotate the rotating means at a predetermined angle when the cylindrical body is mounted, calculates an eccentricity being the difference between the inner diameter center of the cylindrical body and a rotation center of the rotating means from information about the photographed cross-section received from the photographing means, and generates a machining control signal corresponding to the eccentricity. A transferring means transfers the machining control signal, and an adjusting means adjusts the position of the cylindrical body according to the machining control signal received from the transferring means so that the inner diameter center of the cylindrical body is identical with the rotation center of the rotating means.

It is preferable that the photographing means is a CCD (Charge Coupled Device) camera and the adjusting means has a piezoelectric ceramic expanded according to a received voltage value.

To achieve the above object, there is also provided a method of correcting an eccentricity being the difference between a rotation center and an inner diameter center of a cylindrical body which is to be machined and has an inner diameter and an outer diameter. In the eccentricity correcting method, the cylindrical body is first mounted and rotated at a predetermined angle. Then, the cross-section of the cylindrical body rotating is photographed, and the eccentricity is calculated from data of the photographed cross-section. If the eccentricity is 0, the cylindrical body is machined. If the eccentricity is not 0, the eccentricity is corrected by generating a signal corresponding to the eccentricity and adjusting the position of the cylindrical body. The above steps are repeated until the eccentricity is 0.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein:

FIG. 4A is a block diagram of a concentric machining device according to the present invention;

DETAILED DESCRIPTION OF THE DRAWINGS

Figure 1:
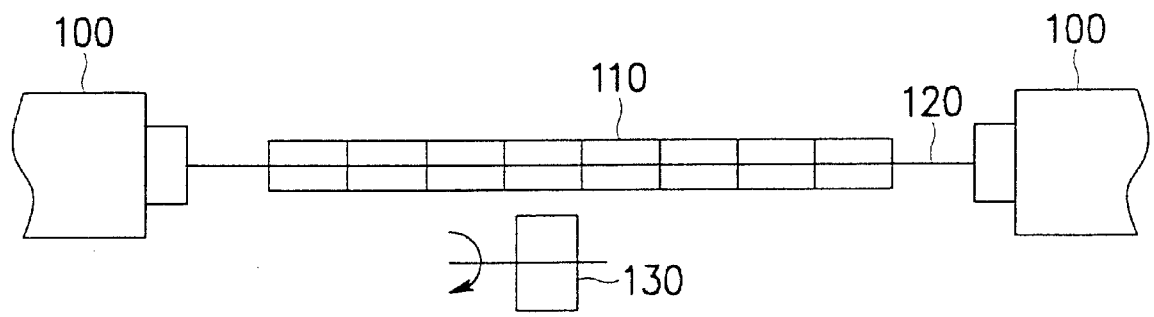
FIG. 1 is a schematic view of a conventional concentric ferrule machining system.

Turning now to the drawings, FIG. 1 is a schematic view of a conventional concentric ferrule machining system as discussed above. For concentric machining of ferrules 110, a wire 120 is inserted into the inner diameter of the plurality of ferrules 110, both ends of the wire 120 are fixed to fixtures 100, a tensile force is applied to the wire 120, and then the outer circumferential surfaces of the ferrules 110 are machined using a polishing wheel 130.

Figure 2A:
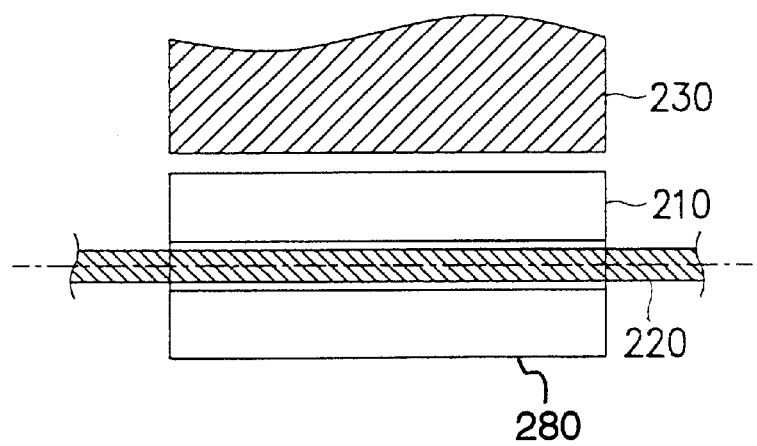
FIGS. 2A and 2B are views referred to for describing the machining principle of the concentric machining system shown in FIG. 1.
Figure 2B:
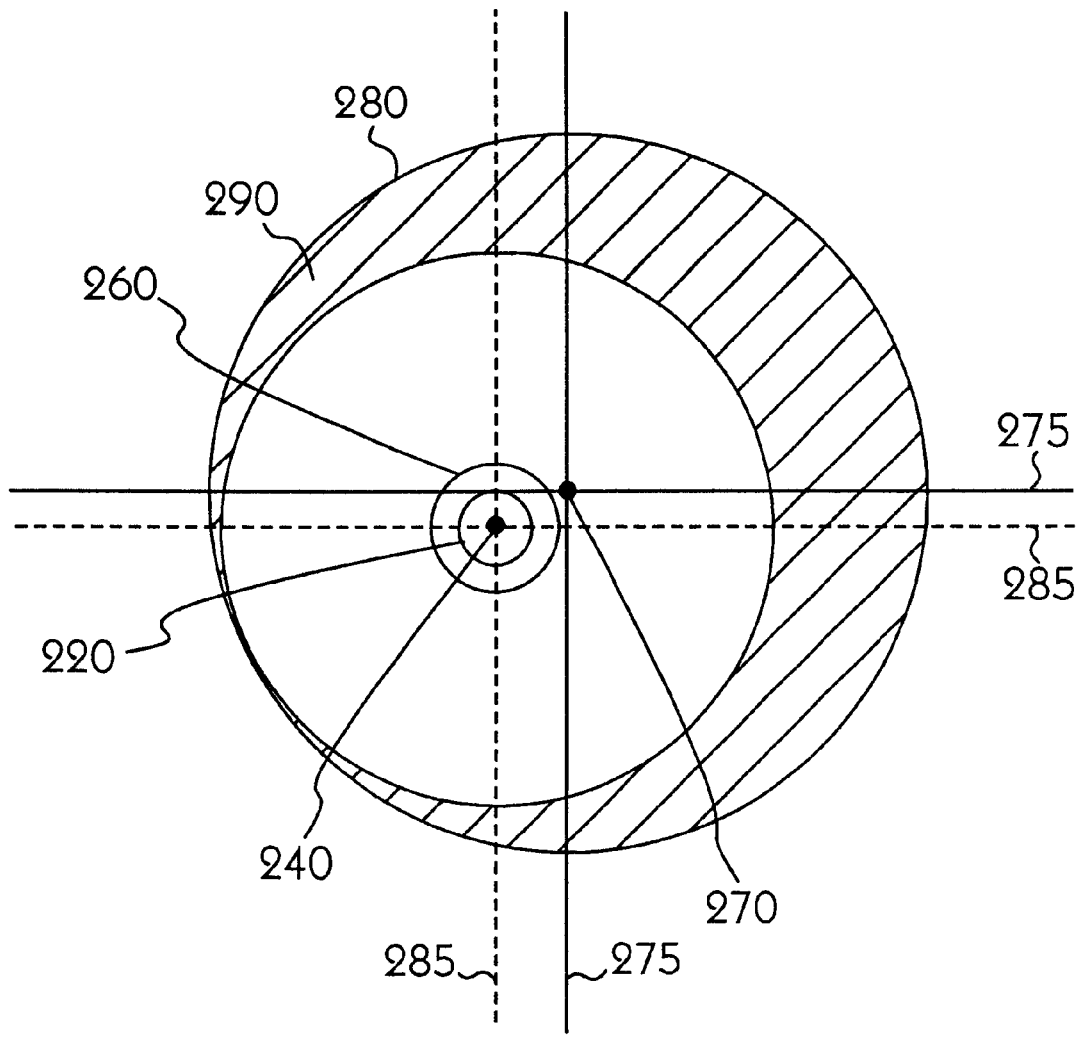

FIGS. 2A and 2B are views referred to for describing a machining principle in the concentric machining system of FIG. 1. To concentrically machine a cylindrical body 210 having an inner diameter and an outer diameter, a steel wire 220 processed with high precision is inserted into the bore, or inner diameter 260, of the cylindrical body 210 and an outer circumferential surface 280 of the cylindrical body 210 is machined by a predetermined amount 290 by a polishing wheel 230, with the center 240 of the inserted wire 220 set as the center of the inner diameter of the object 210. Here, reference numeral 270 is the center of the outer circumferential surface 280 at the start of machining. Thus, the different inner and outer diameters (dotted line 275) become identical (dotted line 285) after machining the outer circumferential surfaced 280 of the cylindrical body 210 concentric with the center 240 of the inner diameter.

However, the conventional machining method has some problems in machining range and precision.

(1) Wires are seldom, if ever, suitable for a very small inner diameter. Even such a wire does not withstand a tensile force applied to both ends thereof in concentric machining of a machining object due to the too small inner diameter.

Figure 3A:
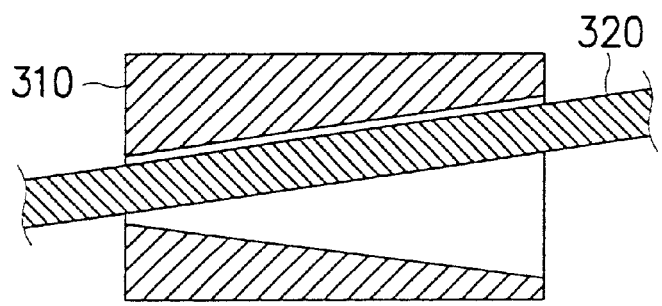
FIG. 3A illustrates a taper with a wire inserted into the inner diameter thereof for concentric machining in the conventional concentric machining system.

(2) Concentric machining is impossible if an inner circle of a machining object is tapered or in an irregular shape. FIG. 3A illustrates a wire 320 inserted into the inner diameter of a taper 310 for concentric machining. As shown in the drawing, the concentric machining is impossible despite the insertion of the wire 320 due to a varied inner diameter.

Figure 3B:
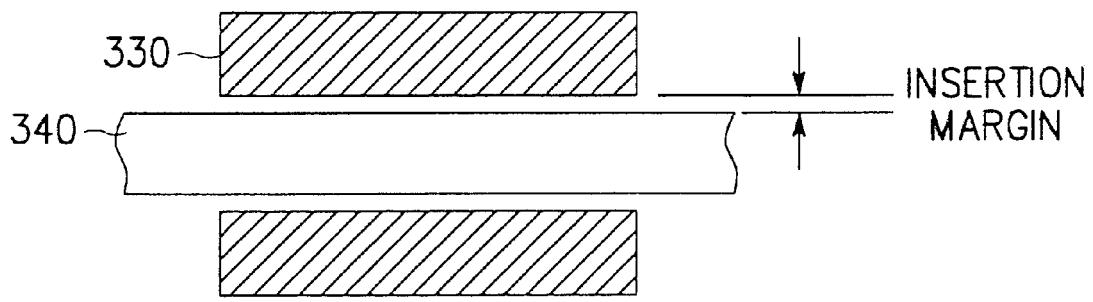
FIG. 3B is a side sectional view of a machining object with the wire inserted into the inner diameter thereof.

(3) There is a limit to increasing precision. FIG. 3B is a side sectional view of an wire 340 inserted into the inner diameter of a machining object 330. Here, if an insertion margin between the inner diameter and the wire is 0.3 $\mu$m and the machining precision of the wire 340 is 0.2 $\mu$m, the machining precision of the inner diameter is 0.5 $\mu$m. Therefore, a maximum error of 1 $\mu$m can occur and the machining object 330 is not suitable for precision machining.

(4) The friction between an inner circumferential surface of a machining object and a wire inserted into the inner diameter of the machining object is likely to scratch or deform the inner circumferential surface.

(5) In concurrently machining a plurality of ferrules by insertion of a wire, possible introduction of foreign materials between the ferrules induces errors, thereby making precision machining impossible.

A preferred embodiment of the present invention will be described hereinbelow with reference to the accompanying drawings. In the following description, well-known functions or constructions are not described in detail since they would obscure the invention in unnecessary detail.

FIG. 4A is a block diagram of a concentric machining device according to the present invention. The concentric machining device includes a chuck 410, a servo motor 420, a spindle 425, a camera 430, a controller 440, a monitor 450, a rotating brush contact point 460, a piezoelectric ceramic unit 470, a spring unit 475, a polishing motor 480, and a polishing tool 485.

A machining object 400 is inserted into the chuck 410. The servo motor 420 and the spindle 425 forms a rotating portion. The chuck 410 is secured in the spindle 425. Upon reception of a rotation control signal from the controller 440, the servo motor 420 rotates and then the spindle 425 rotates the chuck 410 at a predetermined angle. During the rotation, the center of the spindle 425 is a rotation center.

The camera 430 is a photographing portion for photographing the cross-section of the machining object 400 mounted in the chuck 410. A CCD camera is used as the camera 430.

The controller 440 receives information about the cross-section of the machining object 400 from the camera 430 to obtain an eccentricity, that is, the distance between the center of the inner diameter and the rotation center, and generates, a rotation control signal to rotate the machining object 400 at the predetermined angle. A concentricity, which is the diameter of a locus of the center of the inner diameter with respect to the rotation center, is produced because the center of the inner diameter is not identical with the rotation center. The controller 440 calculates the eccentricity from the concentricity and generates a machining control signal corresponding to the eccentricity. The controller 440 also generates a motor driving signal to drive the polishing motor 480 and thus to operate the polishing tool 485.

The monitor 450 displays the cross-section of the machining object 400 photographed by the camera 430, providing an environment where a user can see a magnified view of the photographed cross-section. The camera 430, the controller 440, and the monitor 450 are called a vision system and a computer with a vision board is generally used as the controller 440.

The piezoelectric ceramic unit 470 is an adjustment portion and has piezoelectric ceramics expanded according to an input voltage value. The piezoelectric ceramic unit 470 receives a voltage value from the controller 440 through the rotating brush contact point 460 being a transfer portion and expands according to the voltage value, adjusting the position of the chuck 410.

The spring unit 475 is opposite to the piezoelectric ceramic unit 470 with respect to the chuck 410. As the piezoelectric ceramics expand, the spring unit 475 contracts and vice versa to thereby adjust the position of the chuck 410.

Figure 4B:
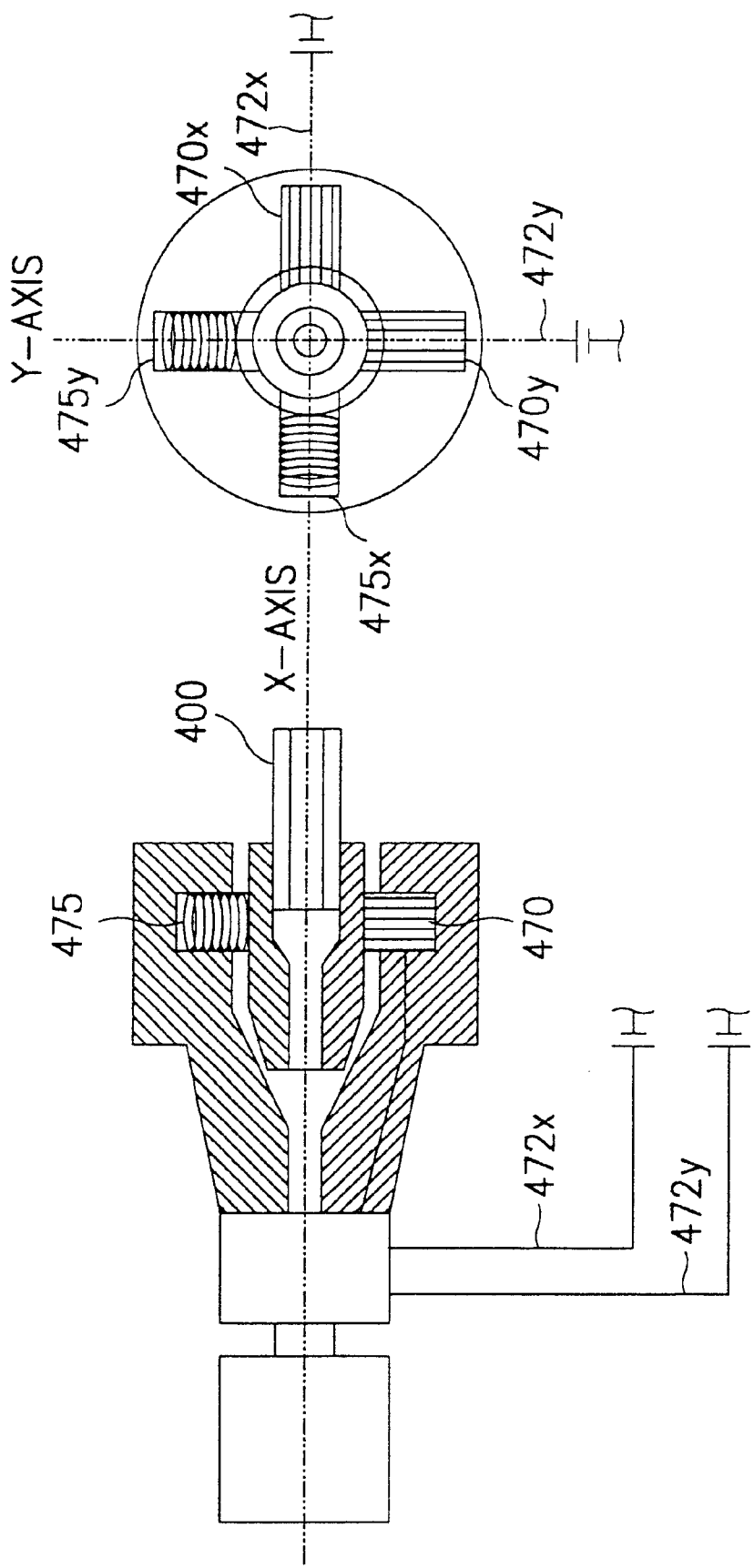
FIG. 4B is a view illustrating the cross section of a machining object installed in the concentric machining device of the present invention and referred to for describing a machining control signal used to set the center of the inner diameter of the machining object to a rotation center.

FIG. 4B illustrates the cross-section of the machining object mounted in the concentric machining device according to the present invention and is referred to for describing a machining control signal used to set the center of the inner diameter of the machining object to the rotation center.

The piezoelectric ceramic unit 470 includes a horizontal piezoelectric ceramic 470x for positioning the chuck 410 in a horizontal direction and a vertical piezoelectric ceramic 470y for positioning the chuck 410 in a vertical direction on the cross-section of the machining object 400. A vertical direction machining control signal and a horizontal direction machining control signal are connected to the horizontal and vertical piezoelectric ceramics 470x and 470y, respectively. The spring unit 475 includes a horizontal direction spring 475x opposite to the horizontal piezoelectric ceramic 470x and a vertical direction spring 475y opposite to the vertical piezoelectric ceramic 470y with respect to the chuck 410.

The rotating brush contact point 460 transmits the machining control signals 472x and 472y generated from the controller 440 to the piezoelectric ceramics 470x and 470y. It is preferable to use the rotating brush contact point 460 in transmitting a voltage being a machining control signal to the rotating piezoelectric ceramics 470x and 470y.

The polishing motor 480 drives the polishing tool 485 to polish the outer circumferential surface of the machining object 400 under the control of the controller 440.

Now, there will be given a description of the operation of the concentric machining device according to the present invention.

Figure 5:
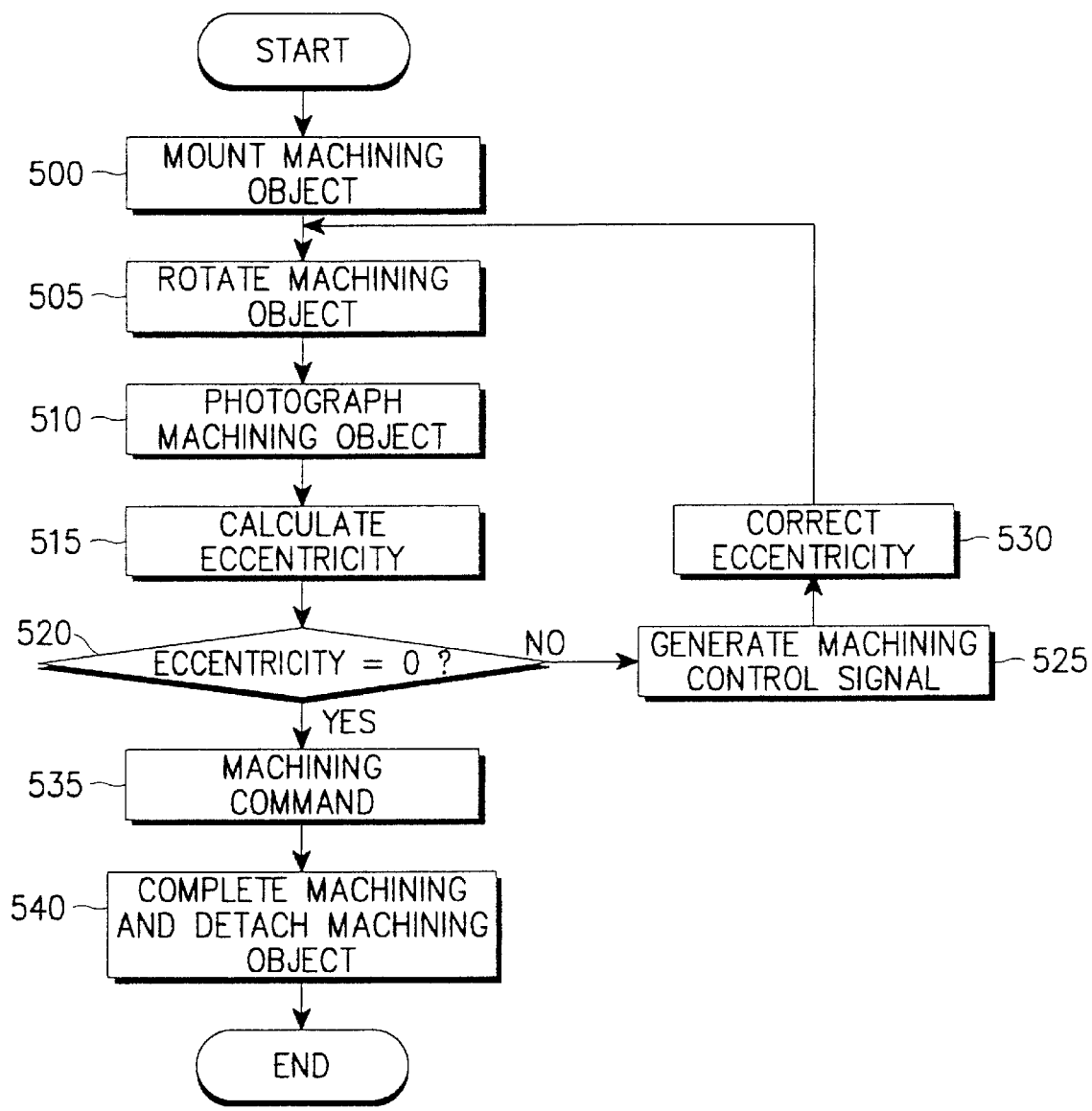
FIG. 5 is a flowchart depicting an eccentricity correcting method according to the present invention and the operation of the concentric machining device of the present invention.

FIG. 5 is a flowchart depicting an eccentricity correction method of the present invention and the operation of the concentric machining device.

If the machining object 400 of FIG. 4A is inserted into the chuck 410 by an automatic supply device (not shown) in step 500, the servo motor 420 rotates the machining object 400 according to a rotation control signal received from the controller 440 in step 505.

The camera 430, which is installed with its photographing center aligned with the rotation center of the spindle 425, photographs the cross-section of the machining object 400 rotating, in step 510. In step 515, the controller 440 receives data of the photographed cross-section and calculates an eccentricity.

Figure 6A:
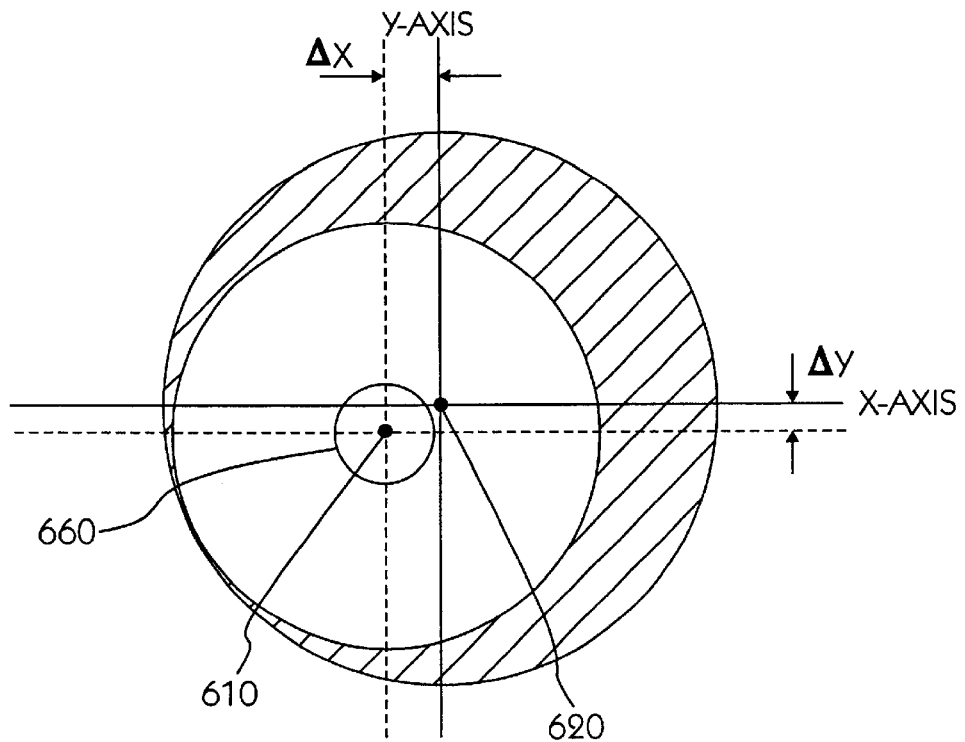
FIG. 6A is a view referred to for describing an eccentricity and the horizontal and vertical components of the eccentricity.
Figure 6B:
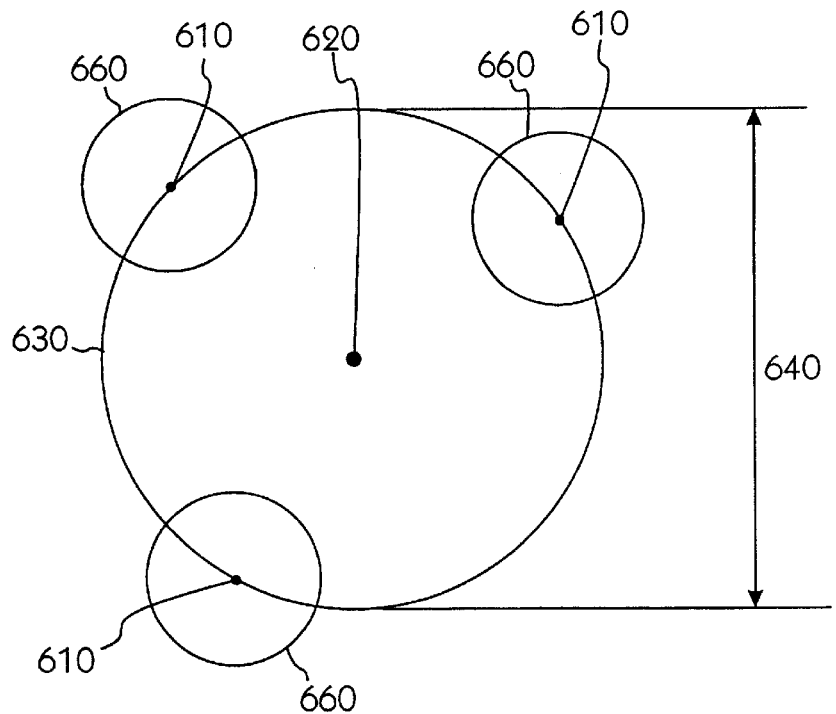
FIG. 6B illustrates the locus of an inner diameter produced by an eccentricity during rotating a machining object.

The eccentricity is calculated in the following way. FIG. 6A is a view referred to for describing the eccentricity and the horizontal and vertical components of the eccentricity, and FIG. 6B illustrates the locus of an inner diameter generated due to the eccentricity during rotating the machining object. In FIG. 6B, a very large eccentricity is given by way of example for better understanding of the relation among the center 610 of the inner diameter, that is the bore, 660, of the machining object, the rotation center 620, the eccentricity, and the concentricity.

The eccentricity refers to a degree to which an inner diameter center 610 deviates from a rotation center 620 while the machining object 400 is rotated in the chuck 410. Here, let the rotation center 620 be the origin of coordinates. Then, the horizontal and vertical components of the eccentricity are $\Delta x$ and $\Delta y$, respectively.

When the spindle 425 is being rotated by rotation of the servo motor 420 according to a rotation control signal received from the controller 440, the inner diameter center 610 traces out a circle 630 the center of which is the rotation center 620. The diameter of the circular locus 630 is a concentricity 640. The relation between the concentricity 640 and the horizontal and vertical eccentricity components $\Delta x$ and $\Delta y$ can be found in $$\text{Concentricity} = 2 \times \sqrt{(\Delta x)^2 + (\Delta y)^2} \tag{1}$$

During the rotation of the spindle 425, the horizontal and vertical eccentricity components $\Delta x$ and $\Delta y$ vary, satisfying Eq. 1. The variation is calculated by the controller 440 when needed.

It is preferable that the rotation center of the spindle 425 is identical with the photographing center of the camera 430 because the centers, when they are identical, become the origin of coordinates and thus calculations required for obtaining the concentricity and the horizontal and vertical eccentricity components Δx and Δy are reduced.

In step 515, the controller 440 calculates the horizontal and vertical eccentricity components Δx and Δy from the image data received from the camera 430. The controller 440 compares each of the horizontal and vertical eccentricity components Δx and Δy with 0 in step 520. If both the horizontal and vertical eccentricity components Δx and Δy are 0s, the controller 440 generates a machining command in step 535. In step 540, the controller 440 rotates the polishing motor 480 to machine the machining object 400 with use of the polishing tool 485 and the machining object 400 is detached from the chuck 410 by the automatic supply device if it is completely machined.

If the eccentricity is not 0, the controller 440 generates the horizontal direction machining control signal 472x for the horizontal component Δx and the vertical direction machining control signal 472y for the vertical component Δy in step 525. The horizontal direction machining control signal 472x and the vertical direction machining control signal 472y are applied to the horizontal and vertical piezoelectric ceramics 470x and 470y, respectively through the rotating brush contact point 460.

As shown in FIGS. 4A and 4B, upon reception of the horizontal direction machining control signal 472x, the horizontal piezoelectric ceramic 470x is expanded and then the horizontal spring 475x moves the chuck 410 horizontally. Upon reception of the vertical direction machining control signal 472y, the vertical piezoelectric ceramic 470y is expanded and then the vertical spring 475y moves the chuck 410 vertically.

As another preferred method of positioning the spindle 425, the chuck 410 and the horizontal & vertical piezoelectric ceramics 470x and 470y are integrally connected so that the corresponding piezoelectric ceramics 470x and 470y are expanded in response to the horizontal and vertical machining control signals 472x and 472y and thus the chuck 410 moves horizontally and vertically. This method obviates the need for using the horizontal and vertical springs 475x and 475y.

A third preferred method of controlling the chuck 410 can be achieved by disposing piezoelectric ceramics in the locations of the horizontal and vertical springs 475x and 475y and applying signals corresponding to the horizontal and vertical machining control signals 472x and 472y to the piezoelectric ceramics, respectively. The number of piezoelectric ceramics is increased but the position of a machining object can be adjusted more reliably.

By choosing one of the above methods, the eccentricity is corrected in step 530 and then steps 505 to 530 are repeated until the eccentricity is 0.

In accordance with the present invention as described above, a chuck having a machining object secured therein is controlled by use of piezoelectric ceramics according to a voltage value corresponding to the distance between the inner diameter center of the machining object and a rotation center. Therefore, the present invention has the advantages: (1) the outer circumferential surface of the machining object can be machined regardless of the size and shape of an inner circle thereof, thereby enabling a machining object with a tapered inner circle or an irregular inner circle to be machined and overcoming the limit of a machining range; (2) errors produced by a machining tool can be reduced regardless of its precision and thus a part requiring a very high precision of 1 $\mu$m or below can be machined with reliability; and (3) an eccentricity is automatically corrected, thereby allowing an automatic machining to be implemented and ensuring product reliability.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A concentric machining device for machining the outer circumferential surface of a cylindrical body having an inner diameter and an outer diameter with respect to the center of the inner diameter, comprising:

mounting means for mounting the cylindrical body therein;

rotating means for installing the mounting means therein and rotating the mounting means and the cylindrical body according to a rotation control signal;

photographing means for photographing a cross-section of the cylindrical body;

controlling means for generating the rotation control signal to rotate the rotating means at a predetermined angle when the cylindrical body is mounted, calculating an eccentricity being the difference between the inner diameter center of the cylindrical body and a rotation center of the rotating means from information about the photographed cross-section received from the photographing means, and generating a machining control signal corresponding to the eccentricity;

transferring means for transferring the machining control signal; and adjusting means for adjusting a position of the cylindrical body according to the machining control signal received from the transferring means so that the inner diameter center of the cylindrical body is identical with the rotation center of the rotating means,
whereby the center of the outer diameter is identical with the center of the inner diameter.

2. The concentric machining device of claim 1, wherein the rotation center of the rotating means is aligned with a photographing center of the photographing means in a line.

3. The concentric machining device of claim 1, wherein the photographing means is a CCD (Charge Coupled Device) camera.

4. The concentric machining device of claim 1, wherein the transferring means is a rotating brush contact point.

5. The concentric machining device of claim 1, wherein the adjusting means comprises a piezoelectric ceramic expanded according to the machining control signal.

6. The concentric machining device of claim 5, wherein the adjusting means comprises a piezoelectric ceramic in each of horizontal and vertical axes of coordinates with the rotation center of the rotating means as an origin.

7. The concentric machining device of claim 6, wherein the adjusting means further comprises a spring opposite to each of the piezoelectric ceramics with respect to the mounting means.

8. The concentric machining device of claim 6, wherein the adjusting means further comprises a piezoelectric ceramic which is opposite to each of the piezoelectric ceramics with respect to the mounting means and receives another machining control signal corresponding to the machining control signal.

9. A method of correcting an eccentricity being the difference between a rotation center and an inner diameter center of a cylindrical body which is to be machined and has an inner diameter and an outer diameter, comprising the steps of:

(i) mounting the cylindrical body;

(ii) rotating the cylindrical body at a predetermined angle;

(iii) photographing a cross-section of the cylindrical body rotating;

(iv) receiving data of the photographed cross-section and calculating the eccentricity from the data;

(v) machining the cylindrical body if the eccentricity is 0, and correcting the eccentricity by generating a signal corresponding to the eccentricity and adjusting a position of the cylindrical body if the eccentricity is not 0; and (vi) repeating steps (ii) to (v) until the eccentricity is 0 whereby the center of the outer diameter is identical with the center of the inner diameter.

10. The method of claim 9, wherein the eccentricity is divided into a horizontal component and a vertical component in horizontal and vertical axes of coordinates with the rotation center as an origin and a signal corresponding to the eccentricity is generated for each of the horizontal and vertical components.

11. A method for machining a cylindrical body concentric with an axial bore through the body, comprising the steps of:

mounting a machining object having a bore, in a chuck, with the bore aligned with a rotation axis of the chuck and with a first end of the object facing away from the chuck;

rotating the chuck and the mounted machining object by rotating a spindle holding the chuck;

determining concentricity by measuring a rotation path of a center of the bore at the first end of the machining object;

when the determined concentricity is not equal to zero, adjusting horizontal and vertical positions of the chuck in the spindle, to make the concentricity equal to zero;

when the concentricity is equal to zero, machining an outer surface of the object and then removing the machined object from the chuck.

12. The method of claim 11, said step of determining the concentricity further comprising:

photographing the rotating center of the bore at the first end using a video camera mounted aligned with the rotation axis of the spindle.

13. The method of claim 12, said step of determining the concentricity further comprising:

photographing the cross-section of the rotating first end the mounted object, and determining the concentricity using a controller connected to the video camera.

14. The method of claim 13, further comprising:

determining the horizontal and vertical components of the eccentricity from the measured concentricity; and said step of adjusting the horizontal and vertical positions of the chuck in the spindle further comprising adjusting said positions to reduce the horizontal and vertical components of the eccentricity.

15. The method of claim 11, further comprising the step of:

holding the chuck in the spindle using horizontally and vertically mounted piezoelectric ceramics; and said step of adjusting the horizontal and vertical positions of the chuck in the spindle further comprising activating the horizontal and vertical piezoelectric ceramics.

16. The method of claim 15, said step of activating the horizontal and vertical piezoelectric ceramics further comprising:

generating horizontal and vertical machining control signals to the piezoelectric ceramics.

17. The method of claim 16, said step of generating control signals further comprising:

generating control signals having a voltage value corresponding to the radius of said rotation path.

18. The method of claim 11, further comprising the step of:

holding the chuck in the spindle using horizontally and vertically mounted piezoelectric ceramics and two springs opposing the action of the piezoelectric ceramics; and said step of adjusting the horizontal and vertical positions of the chuck in the spindle further comprising activating the horizontal and vertical piezoelectric ceramics.

19. The method of claim 11, further comprising the step of:

holding the chuck in the spindle using two opposed horizontally mounted and two opposed vertically mounted piezoelectric ceramics; and said step of adjusting the horizontal and vertical positions of the chuck in the spindle further comprising activating the horizontal and vertical piezoelectric ceramics.

20. The method of claim 11, further comprising the step of:

holding the chuck in the spindle using integrally connected horizontally and vertically mounted piezoelectric ceramics; and said step of adjusting the horizontal and vertical positions of the chuck in the spindle further comprising activating the integrally connected horizontal and vertical piezoelectric ceramics.

21. The method of claim 11, said step of adjusting the horizontal and vertical positions of the chuck in the spindle further comprising:

correcting the eccentricity by adjusting the horizontal and vertical positions of the chuck as a function of the determined concentricity; and repeating said steps of determining the concentricity and correcting the eccentricity until the determined concentricity is equal to zero.

22. A concentric machine device, comprising:

a chuck for holding one end of a machining object having a central bore;

a spindle for holding the chuck, said spindle comprising:

a horizontal piezoelectric ceramic between the chuck and the spindle, for adjusting the position of the chuck in a horizontal direction;

a vertical piezoelectric ceramic between the chuck and the spindle, for adjusting the position of the chuck in a vertical direction; and a rotating brush contact point for inputting signals to the piezoelectric ceramics;

a motor for rotating the chuck;

a polishing tool mounted in position to machine an outer surface of the machining object;

a camera mounted along a rotation axis of the spindle facing an end of the machining object opposite the chuck;

a controller connected to the camera and the rotating brush contact point, for determining a concentricity of the rotation of center of the bore and generating a control signal to the rotating brush contact points.

23. The device of claim 22, said spindle further comprising:

a horizontal spring between the chuck and the spindle opposite the horizontal piezoelectric ceramic; and a vertical spring between the chuck and the spindle opposite the vertical piezoelectric ceramic.

24. The device of claim 22, said spindle further comprising:

a second horizontal piezoelectric ceramic between the chuck and the spindle opposite the horizontal piezoelectric ceramic; and a second vertical piezoelectric ceramic between the chuck and the spindle opposite the vertical piezoelectric ceramic;

said second horizontal and vertical piezoelectric ceramics being connected to the rotating brush contact point.

25. The device of claim 22, said spindle further comprising:

said horizontal and vertical piezoelectric ceramics being integrally connected.

* * * * *